United States Patent
Terada

(10) Patent No.: US 10,722,989 B2
(45) Date of Patent: Jul. 28, 2020

(54) TURBINE ROTOR DISC REPAIRING METHOD

(71) Applicant: MITSUBISHI HEAVY INDUSTRIES COMPRESSOR CORPORATION, Tokyo (JP)

(72) Inventor: Katsumi Terada, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 244 days.

(21) Appl. No.: 15/770,134

(22) PCT Filed: Nov. 24, 2016

(86) PCT No.: PCT/JP2016/004951
§ 371 (c)(1),
(2) Date: Apr. 20, 2018

(87) PCT Pub. No.: WO2017/110039
PCT Pub. Date: Jun. 29, 2017

(65) Prior Publication Data
US 2018/0304419 A1 Oct. 25, 2018

(30) Foreign Application Priority Data
Dec. 25, 2015 (JP) .................. 2015-252713

(51) Int. Cl.
*B23P 6/00* (2006.01)
*B23K 9/00* (2006.01)
(Continued)

(52) U.S. Cl.
CPC ............... *B23P 6/007* (2013.01); *B23K 9/00* (2013.01); *B23K 9/04* (2013.01); *B23K 9/235* (2013.01);
(Continued)

(58) Field of Classification Search
CPC ......... B23P 6/007; B23P 6/002; B23P 15/006; B23K 9/235; B23K 9/04; B23K 31/00;
(Continued)

(56) References Cited

U.S. PATENT DOCUMENTS 3,731,868 A * 5/1973 Arikawa ................ B23K 9/035
75/316
4,962,586 A * 10/1990 Clark ..................... B23K 9/028
29/889.2
(Continued)

FOREIGN PATENT DOCUMENTS

JP  S56-119667 A  9/1981
JP  S59-92167 A  5/1984
(Continued)

OTHER PUBLICATIONS

Notification of Reasons for Refusal issued in corresponding Japanese Patent Application No. 2015-252713, dated Jun. 4, 2019 (9 pages).

*Primary Examiner* — Sarang Afzali
*Assistant Examiner* — Ruth G Hidalgo-Hernandez
(74) *Attorney, Agent, or Firm* — Osha Liang LLP

(57) ABSTRACT

Provided is a turbine rotor disc repairing method for removing a defect portion created in an outer peripheral portion of a turbine rotor disc having a blade groove formed in the outer peripheral portion and then reforming the blade groove. The method includes: removing a region including the defect portion from the turbine rotor disc with a rotating shaft supported horizontally to form a disc under repair; annularly joining an edge plate along an outer peripheral edge of the disc under repair by welding; performing build-up welding of a surface to be welded while rotating the disc under repair around the rotating shaft; and removing an excess thickness of a build-up weld and the edge plate from
(Continued)

the disc under repair, wherein the disc under repair includes a first groove and a first route surface continuous with the first groove.

8 Claims, 8 Drawing Sheets

(51) Int. Cl.
    *F02C 7/00*     (2006.01)
    *F01D 5/06*     (2006.01)
    *B23K 31/00*     (2006.01)
    *F01D 25/00*     (2006.01)
    *B23K 9/04*     (2006.01)
    *B23K 9/235*     (2006.01)
    *B23P 15/00*     (2006.01)

(52) U.S. Cl.
    CPC .............. *B23K 31/00* (2013.01); *B23P 6/002* (2013.01); *F01D 5/06* (2013.01); *F01D 25/00* (2013.01); *F02C 7/00* (2013.01); *B23P 15/006* (2013.01)

(58) Field of Classification Search
    CPC ... B23K 9/00; F01D 25/00; F01D 5/06; F02C 7/00
    See application file for complete search history.

(56) References Cited

U.S. PATENT DOCUMENTS

| | | | | |
|---|---|---|---|---|
| 5,280,849 A * | 1/1994 | Galanes | ................. | B23K 31/02 219/76.14 |
| 5,348,212 A * | 9/1994 | Galanes | ................. | B23K 31/02 219/146.1 |
| 5,952,109 A * | 9/1999 | Nagami | ................. | B23K 33/00 428/599 |
| 9,441,487 B2 * | 9/2016 | Keller | ................. | F01D 5/063 |
| 2010/0001044 A1 * | 1/2010 | Weibling | ................. | B23K 9/02 228/164 |
| 2014/0124489 A1 | 5/2014 | Zhang et al. | | |

FOREIGN PATENT DOCUMENTS

| | | |
|---|---|---|
| JP | H07-328766 A | 12/1995 |
| JP | 2005-296458 A | 10/2005 |
| JP | 2012-26272 A | 2/2012 |
| JP | 2013-006203 A | 1/2013 |

* cited by examiner

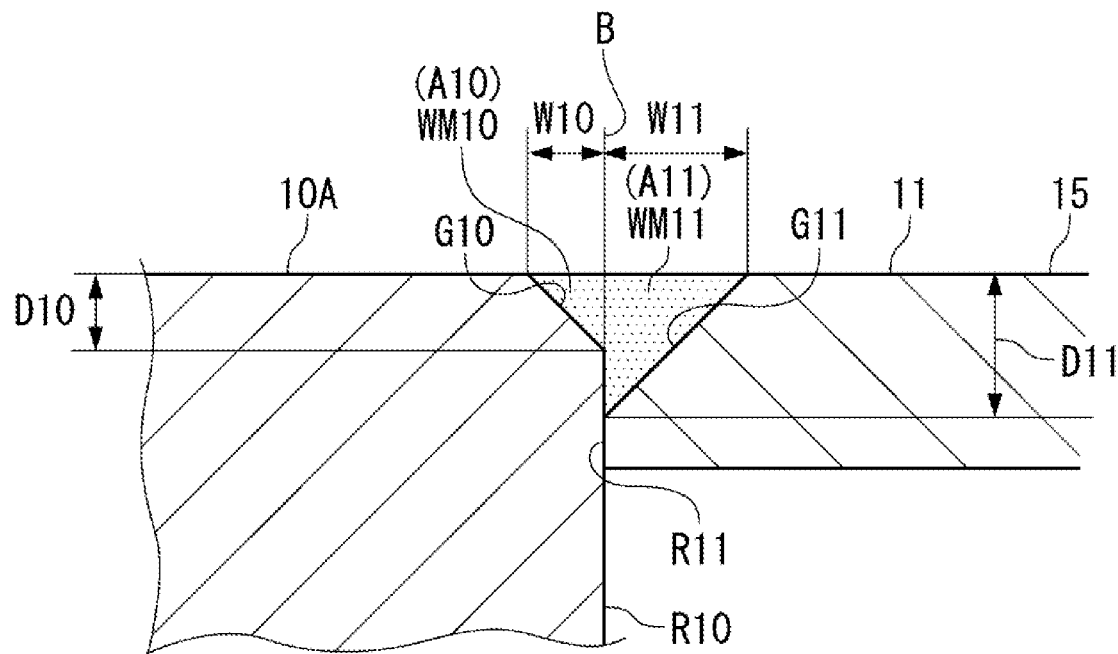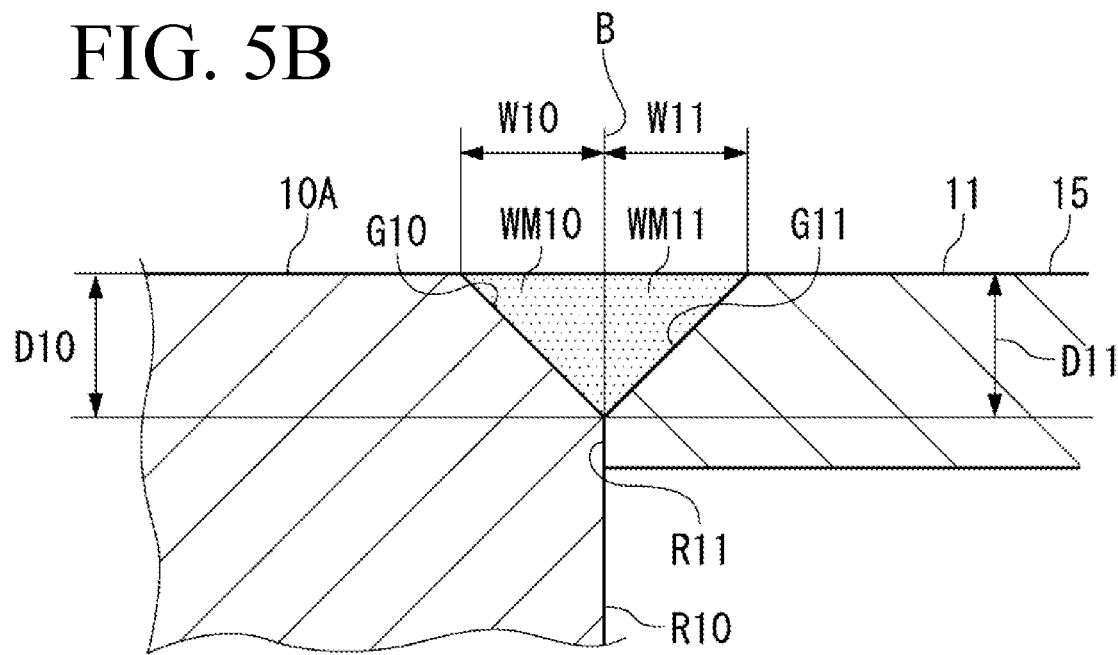

TURBINE ROTOR DISC REPAIRING METHOD

TECHNICAL FIELD

The present invention relates to a turbine rotor disc repairing method, and to a method for removing produced damage and then performing a repair by build-up welding.

BACKGROUND

Thermal power plants and nuclear power plants use a steam turbine to generate electric power. Components of the steam turbine such as a turbine rotor are exposed to an environment subject to corrosion. A crack due to stress corrosion cracking, corrosion fatigue, or the like occurs in a zone on which stress is concentrated such as a blade groove of a turbine rotor disc. The crack grows as an operation continues, and if it is left untouched, a blade is finally disengaged from the turbine rotor disc to destroy other parts. Thus, the power plant conducts regular tests to check whether a crack has occurred in each part of the turbine rotor disc and regularly recognize a growth situation thereof.

As shown in FIG. 8, a turbine rotor R used in a steam turbine includes a plurality of stages of turbine rotor discs (hereinafter sometimes simply referred to as "rotor discs") 101 axially arranged at predetermined intervals on a rotor shaft 100. Each rotor disc 101 has a turbine blade 106 mounted to a blade groove 104 formed in an outer peripheral portion.

In the turbine rotor R described above, if a defect portion such as a crack is created in an outer peripheral portion such as the blade groove 104 and therearound of the rotor disc 101, the turbine rotor R needs to be removed from the steam turbine and conveyed to a repair plant for repair.

To repair the rotor disc by build-up welding, Tungsten Inert Gas (TIG) welding or submerged arc welding may be adopted. Conventionally, the TIG welding at a low welding speed has been more likely to be adopted to prevent grain coarsening at a weld heat affected zone. However, considering welding conditions has allowed application of the submerged arc welding at a high welding speed.

Among them, Patent Literature 1 discloses that a member that prevents flux from dropping from a surface to be welded is arranged close to a rotor disc, and thus flux can be stably deposited on the surface to be welded through a welding step to stably repair a rotor disc by submerged arc welding even if the rotor disc has a small diameter.

PATENT LITERATURE

Patent Literature 1: JP 2012-26272 A

For repairing a rotor disc by build-up welding, as described in Patent Literature 1, a member referred to as an edge plate is mounted to a side surface of the rotor disc to be repaired, for example, by TIG welding so as to be flush with a surface to be welded. The edge plate is provided to prevent flux and powder used for build-up welding from dropping. Thus, once a repair of a rotor is finished, the edge plate is removed. However, it has been confirmed that a weld defect referred to as a blow hole occurs in a welded part of the rotor disc from which the edge plate is removed. The weld defect can be removed by cutting, but it occurs in the side surface of the rotor disc in a circumferential direction, which leads to a great burden of removal. For a large weld defect, the repair is sometimes performed again. The blow hole occurs because a gas generated in or entering weld metal is not released into the air during condensation and is entrapped in the weld metal.

From the above, one or more embodiments of the present invention provide a repairing method capable of suppressing occurrence of a weld defect caused by mounting of an edge plate by welding when the edge plate is mounted to repair a rotor disc.

SUMMARY

One or more embodiments of the present invention provide a rotor disc repairing method for removing a defect portion created in an outer peripheral portion of a rotor disc having a blade groove formed in the outer peripheral portion and then reforming the blade groove, including: a defect removing step of removing a region including the defect portion from the rotor disc with a rotating shaft supported horizontally to form a disc under repair; an edge plate mounting step of annularly joining an edge plate along an outer peripheral edge of the disc under repair by welding; a building-up step of performing build-up welding of a surface to be welded while rotating the disc under repair around the rotating shaft; and an end material removing step of removing an excess thickness of a build-up weld and the edge plate from the disc under repair.

In the repairing method according to one or more embodiments of the present invention, the disc under repair includes a first groove and a first route surface continuous with the first groove, the edge plate includes a second groove and a second route surface continuous with the second groove, and in a case of welding via the first groove and the second groove by butting the first route surface and the second route surface against each other in the edge plate mounting step, when an area of a region occupied by the first groove is represented as $A10$ and an area of a region occupied by the second groove is represented as $A11$ in a longitudinal section through the rotating shaft, $A10 < A11$ . . . Expression (1) is satisfied.

According to one or more embodiments of the present invention, the area $A11$ occupied by the second groove of the edge plate is larger than the area $A10$ occupied by the first groove of the rotor disc, and thus a weld defect, even if occurs, can be guided to weld metal on a side of the second groove of the edge plate. This can suppress a weld defect remaining on a side surface of the rotor disc from which the edge plate has been removed.

In the rotor disc repairing method according to one or more embodiments of the present invention, when the region occupied by the first groove is identified by a depth $D10$ and a width $W10$ and the region occupied by the second groove is identified by a depth $D11$ and a width $W11$, one or both of depth $D10 <$ depth $D11$ . . . Expression (2) and width $W10 <$ width $W11$ . . . Expression (3) are satisfied, and thus Expression (1) is satisfied.

In the rotor disc repairing method according to one or more embodiments of the present invention, when the first groove is constituted by a C-shaped chamfer $Cx$ ($x$ is a dimensional value) and the second groove is constituted by a C-shaped chamfer $Cy$ ($y$ is a dimensional value), $Cx < Cy$ . . . Expression (4) is satisfied, and thus Expression (1) is satisfied.

In the rotor disc repairing method according to one or more embodiments of the present invention, depth $D10 =$ width $W10 = 0$ (zero) may be allowed. This means that only the second groove on a side of the edge plate is provided.

In the rotor disc repairing method according to one or more embodiments of the present invention, the disc under repair and the edge plate form a flush surface to be welded.

In the rotor disc repairing method according to one or more embodiments of the present invention, after the building-up step, a predetermined radial region including a boundary between the disc under repair and the build-up weld is circumferentially cut off.

One or more embodiments of the present invention provide a rotor disc repairing method for removing a defect portion created in an outer peripheral portion of a rotor disc having a blade groove formed in the outer peripheral portion and then reforming the blade groove, including: a defect removing step of removing a region including the defect portion from the rotor disc with a rotating shaft supported horizontally to form a disc under repair; an edge plate mounting step of annularly joining an edge plate along an outer peripheral edge of the disc under repair by welding; a building-up step of performing build-up welding of a surface to be welded while rotating the disc under repair around the rotating shaft; and an end material removing step of removing an excess thickness of a build-up weld and the edge plate from the disc under repair.

In the repairing method according to one or more embodiments of the present invention, the disc under repair includes a first groove and a first route surface continuous with the first groove, the edge plate includes a second groove and a second route surface continuous with the second groove, and in a case of welding via the first groove and the second groove by butting the first route surface and the second route surface against each other in the edge plate mounting step, when an area of a region occupied by the first groove is represented as A10 and an area of a region occupied by the second groove is represented as A11 in a longitudinal section through the rotating shaft, the region occupied by the first groove is identified by a depth D10 and a width W10, the region occupied by the second groove is identified by a depth D11 and a width W11, and depth D10<depth D11 . . . Expression (2) is satisfied.

In the rotor disc repairing method according to one or more embodiments of the present invention, A10<A11 . . . Expression (1) may be satisfied.

A structure of the groove in one or more embodiments of the present invention may be applied to welding irrespective of application. Specifically, one or more embodiments of the present invention provide a welding method for welding a first member including a first groove and a first route surface continuous with the first groove and a second member including a second groove and a second route surface continuous with the second groove via the first groove and the second groove by butting the first route surface and the second route surface against each other, wherein when an area of a region occupied by the first groove is represented as A10 and an area of a region occupied by the second groove is represented as A11 in a section perpendicular to the first route surface and the second route surface butted against each other and through the first groove and the second groove, A10<A11 . . . Expression (1) is satisfied.

The welding method according to one or more embodiments of the present invention may follow the elements of the rotor disc repairing method described above.

One or more embodiments of the present invention provide a welding method for welding a first member including a first groove and a first route surface continuous with the first groove and a second member including a second groove and a second route surface continuous with the second groove via the first groove and the second groove by butting the first route surface and the second route surface against each other, wherein when an area of a region occupied by the first groove is represented as A10 and an area of a region occupied by the second groove is represented as A11 in a section perpendicular to the first route surface and the second route surface butted against each other and through the first groove and the second groove, the region occupied by the first groove is identified by a depth D10 and a width W10, the region occupied by the second groove is identified by a depth D11 and a width W11, and depth D10<depth D11 . . . Expression (2) is satisfied.

In the welding method according to one or more embodiments of the present invention, A10<A11 . . . Expression (1) may be satisfied.

According to one or more embodiments of the present invention, the area A11 occupied by the groove of the edge plate is larger than the area A10 occupied by the groove of the rotor disc, thereby allowing a weld defect to be guided to weld metal on the side of the groove of the edge plate. This can suppress a weld defect remaining on the side surface of the rotor disc from which the edge plate has been removed.

BRIEF DESCRIPTION OF DRAWINGS

FIG. 5A and FIG. 5B are sectional views of a vicinity of grooves of the disc under repair and the edge plate, FIG. 5A shows one or more embodiments of the present invention and FIG. 5B shows a comparative example.

Now, with reference to the accompanying drawings, embodiments of the present invention will be described.

One or more embodiments of the present invention are directed to a method for repairing a turbine rotor disc (hereinafter referred to as a rotor disc) 10 by build-up welding, aiming at suppressing occurrence of a weld defect in a disc under repair 10A when an edge plate 11 is mounted to the rotor disc 10 (disc under repair 10A) by welding.

First, with reference to FIGS. 1A-1D, principal steps of repairing the rotor disc 10 by build-up welding will be described.

Figure 1A:
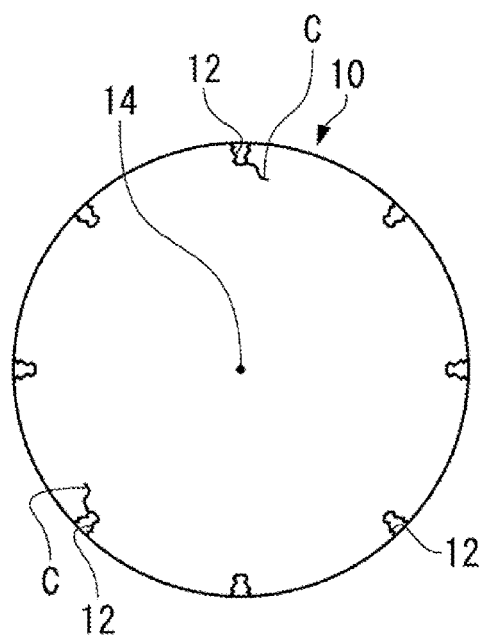
FIGS. 1A-1D illustrate principal steps of a rotor disc welding and repairing method according to one or more embodiments of the present invention.

A welding repair is performed based on a regular test having found a defect caused by a crack C in a blade groove 12 formed in an outer peripheral portion of the rotor disc 10 (FIG. 1A). In FIGS. 1A-1D, a turbine blade (not shown) has been already removed.

Figure 1B:
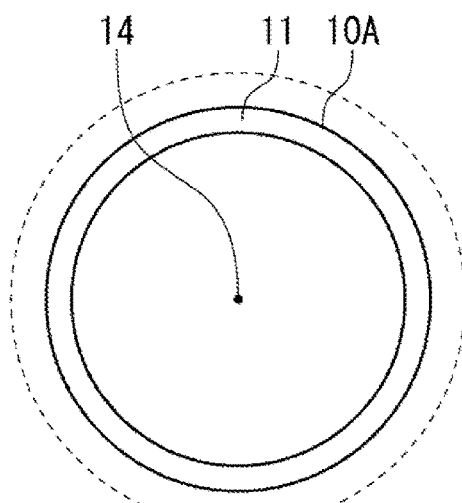
Figure 3A:
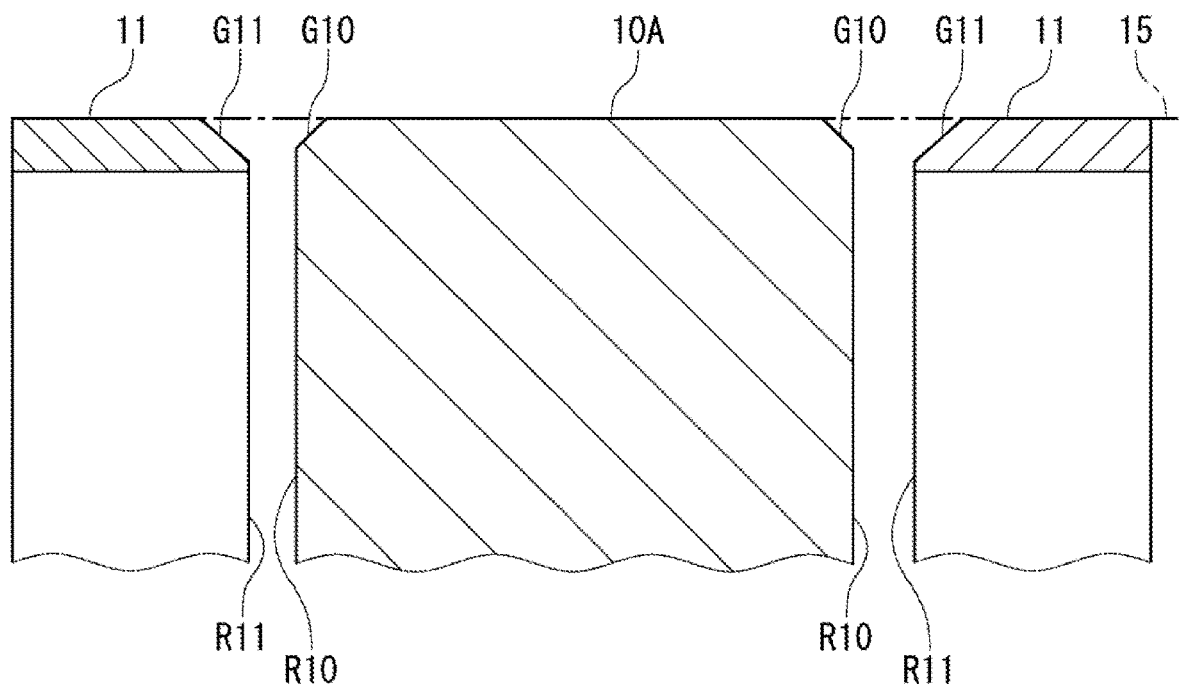
FIG. 3A is a sectional view of a disc under repair before an edge plate is mounted thereto and the edge plate.

When it is determined that a repair is required, a zone from an original outer peripheral surface of the rotor disc 10 to a depth at which the crack C can be removed including a portion of a blade groove 12 without any crack C is circumferentially cut away to obtain a disc under repair 10A from which a defect portion is removed (FIGS. 1B and 3A).

Figure 1D:
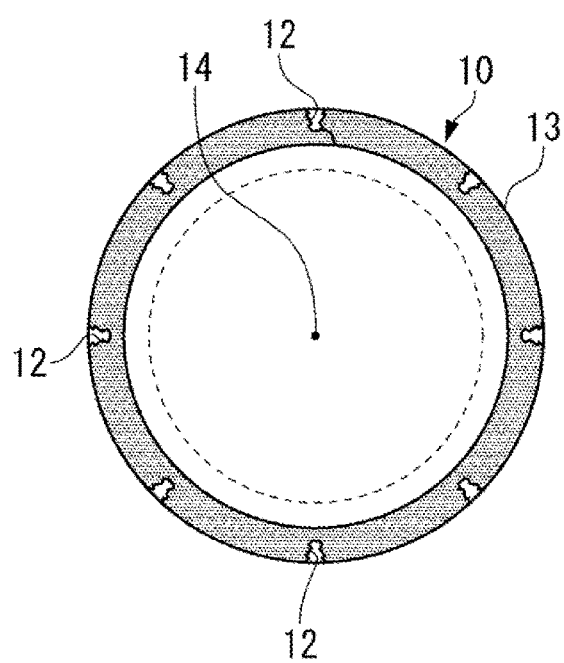
Figure 1C:
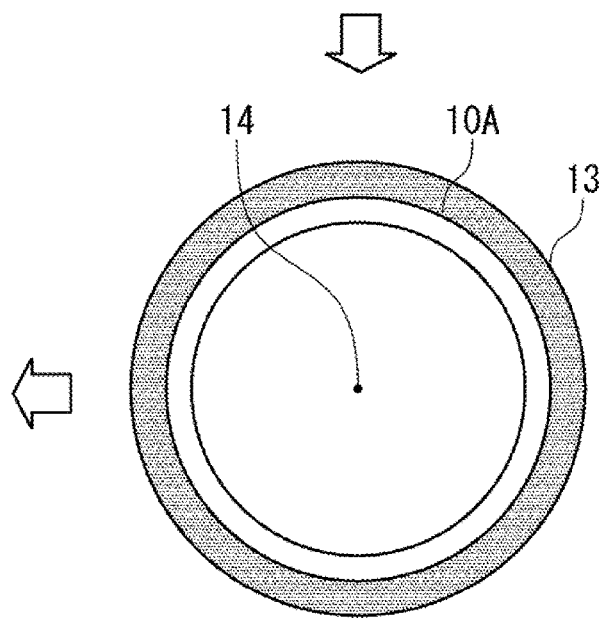
Figure 3B:
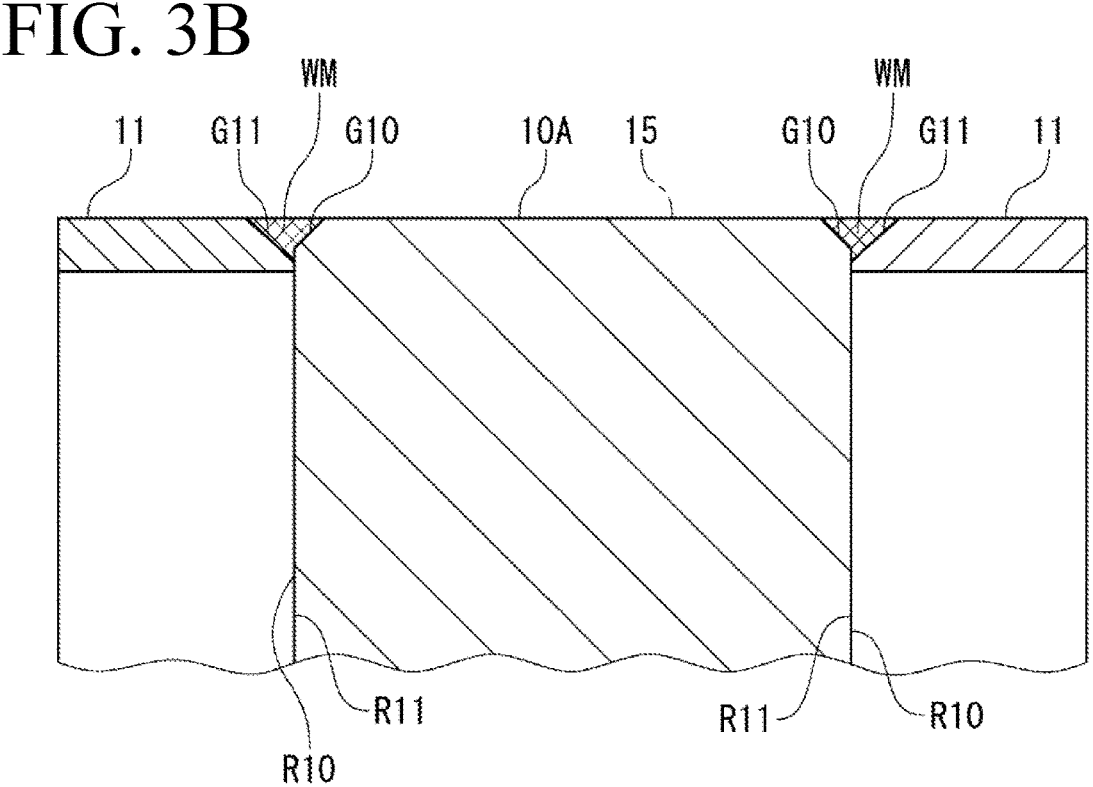
FIG. 3B is a sectional view of the disc under repair to which the edge plate has been mounted according to one or more embodiments of the present invention.
Figure 4A:
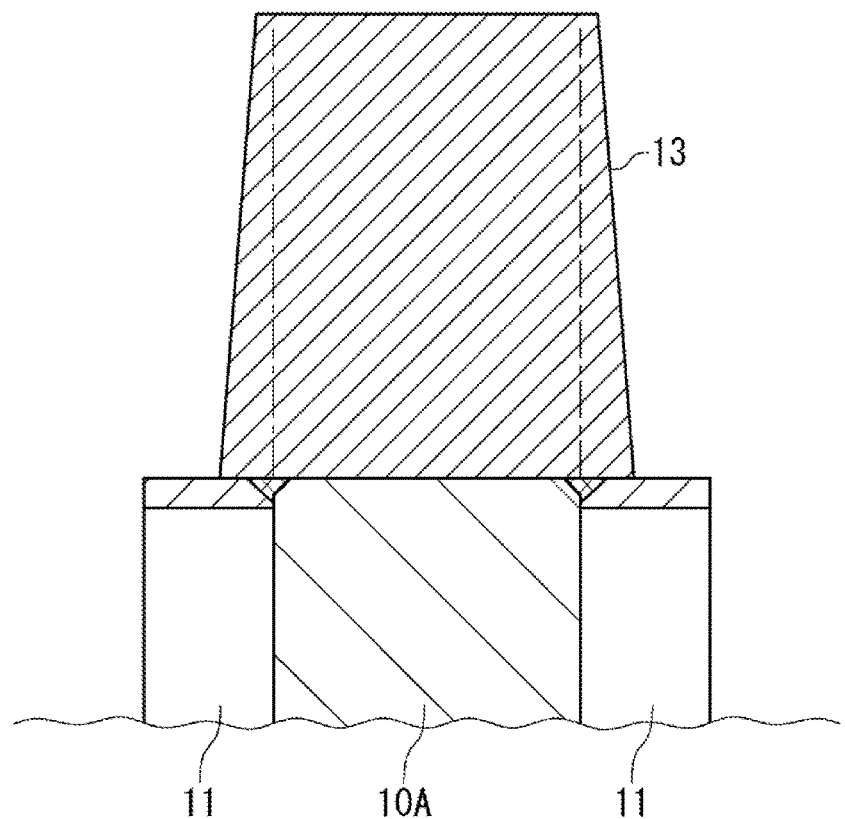
FIG. 4A is a sectional view of build-up welding completed.

Then, a repair portion 13 by build-up welding is provided on an outer periphery of the disc under repair 10A from which the damage is removed (FIGS. 1C and 4A). Before the build-up welding, the edge plate 11 is annularly mounted along an outer peripheral edge of each of opposite side surfaces of the disc under repair 10A by welding. Generally, the edge plate 11 is mounted flush with an outer peripheral surface of the disc under repair 10A (FIG. 3B). This is because a moving locus of a welding torch may only be straight and redundant building-up is unnecessary. In FIG. 3B, for clarity of locations of grooves G10 and G11, weld metal WM only is shown and penetration by welding is omitted. The same applies hereinafter.

Figure 2:
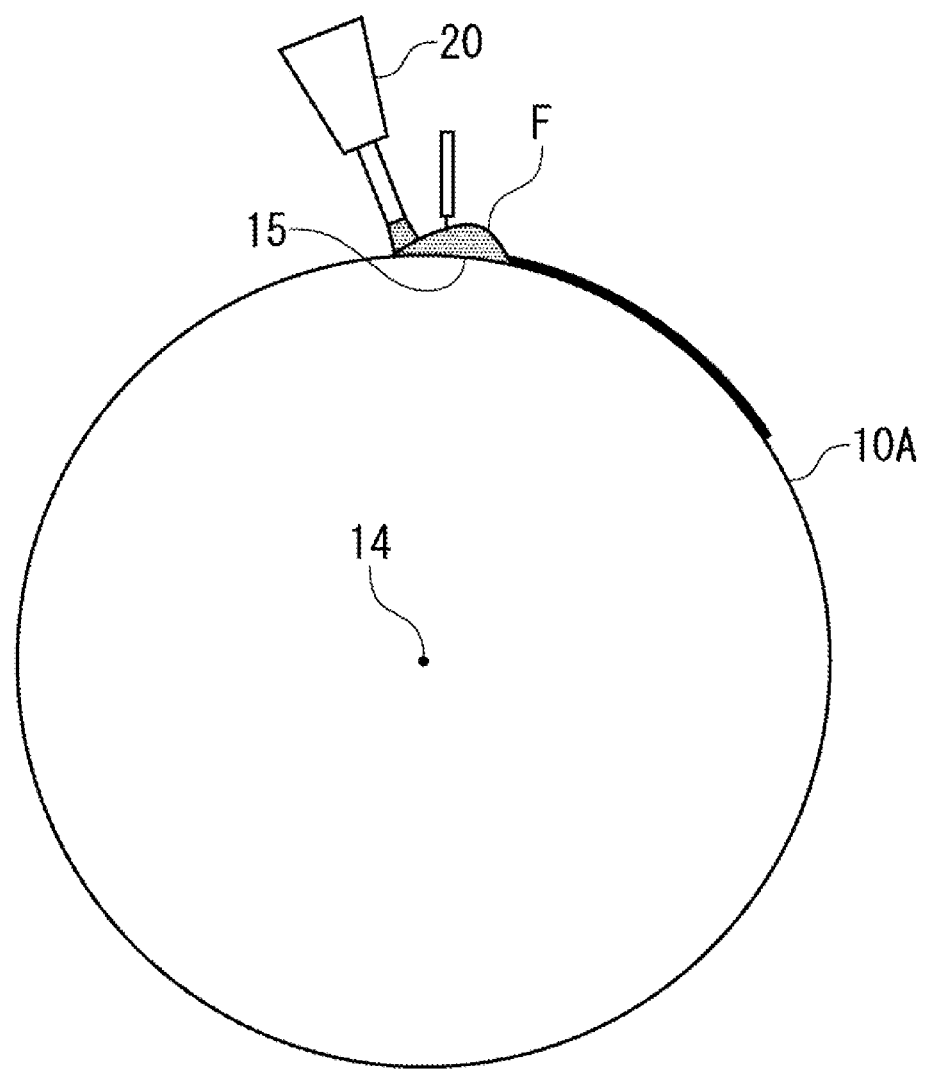
FIG. 2 is a front view of a build-up welding method according to one or more embodiments of the present invention.

As shown in an outline in FIG. 2, the build-up welding is performed while the disc under repair 10A with a rotating shaft 14 supported horizontally is rotated around the rotating shaft 14. The build-up welding is performed while flux F is supplied from a hopper 20 and deposited on a surface to be welded 15 constituted by the outer peripheral surface of the disc under repair 10A.

Figure 4B:
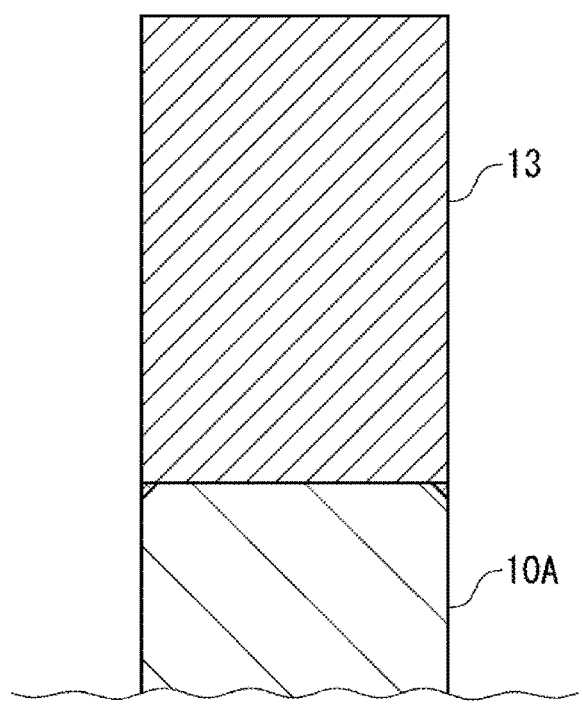
FIG. 4B is a sectional view of the disc under repair from which an end material including the edge plate has been removed, following FIGS. 3A and 3B according to one or more embodiments of the present invention.

After the build-up welding is performed by a predetermined amount, the edge plate 11 and other end materials such as an excess thickness are removed (FIG. 4B), and a blade groove 12 is formed, thereby finishing the repair of the rotor disc 10 (FIG. 1D).

The build-up welding is performed by submerged arc welding. The turbine blade (not shown) is mounted to the rotor disc 10 via a newly formed blade groove 12 to reproduce the rotor disc 10. As described below with reference to FIGS. 2 to 4, one or more embodiments of the present invention have a feature in a step of build-up welding among the steps described above.

One or more embodiments suppress occurrence of a weld defect on a side of the disc under repair 10A on the assumption that the edge plate 11 is mounted to a side surface of the disc under repair 10A by welding, and as the suppression means, dimensions of the groove (first groove) G10 and the groove (second groove) G11 for welding of the disc under repair 10A and the edge plate 11, respectively are adjusted. As a specific example, a depth D11 and a width W11 of the groove G11 on a side of the edge plate 11 are larger than a depth D10 and a width W10 of the groove G10 on a side of the disc under repair 10A. Thus, a weld defect, even if occurs, is guided to weld metal WM11 on the side of the edge plate 11. This will be described below in detail.

As shown in FIGS. 3A and 3B, for welding by butting a route surface (first route surface) R10 that constitutes each of opposite side surfaces of the disc under repair 10A and a route surface (second route surfaces) R11 that constitutes a side surface of the edge plate 11, the groove G10 continuous with the route surface R10 is formed in the disc under repair 10A, and the groove G11 continuous with the route surface R11 is formed in the edge plate 11.

The grooves G10 are formed along and circumferentially continuously with outermost peripheral edges of both the route surfaces R10 of the disc under repair 10A. Although the groove G10 in one or more embodiments of the present invention are constituted by a C-shaped chamfer, the present invention is not limited to this, but a different groove shape, for example, an R-shaped groove G10 may be formed. The same applies to the groove G11. As shown in FIG. 5A, the groove G10 is identified in dimension by a depth D10 and a width W10 in a longitudinal section through the rotating shaft 14 of the disc under repair 10A. The longitudinal section is a section perpendicular to the route surface R10 and the route surface R11 butted against each other and through the groove G10 and the groove G11.

As shown in FIG. 1B, the edge plate 11 has an annular shape by curving a plate material, and the groove G11 is formed along and circumferentially continuously with an outermost peripheral edge of one side surface of the edge plate 11. As shown in FIG. 5A, the groove G11 is identified in dimension by a depth D11 and a width W11 in the longitudinal section through the rotating shaft 14 of the disc under repair 10A.

In one or more embodiments of the present invention, for the groove G10 and the groove G11, as shown in FIG. 5A and Expressions (2) and (3) below, the depth D11 is larger than the depth D10 and the width W11 is larger than the width W10. This allows a weld defect to be guided toward the edge plate 11 for the following reason. In FIG. 5A, the groove G10 and the groove G11 are both constituted by C-shaped chamfers, and when the dimensions of the C-shaped chamfers are represented as Cx and Cy (x and y are dimensional values), respectively, Expression (4) is satisfied.

$$\text{depth D10} < \text{depth D11} \tag{2}$$

$$\text{width W10} < \text{width W11} \tag{3}$$

$$Cx < Cy \tag{4}$$

When the disc under repair 10A and the edge plate 11 are butted and welded, a weld defect may occur in the weld metal WM formed in the groove G10 and the groove G11.

At this time, if the depth D10 is equal to the depth D11 and the width W10 is equal to the width W11 as in a comparative example shown in FIG. 5B, an amount of weld metal WM10 on the side of the groove G10 of the disc under repair 10A is equal to an amount of weld metal WM11 on the side of the groove G11 of the edge plate 11 with a boundary line B therebetween defined by a butting surface between the route surface R10 and the route surface R11. Thus, it can be considered that a probability of occurrence of a weld defect in the weld metal WM10 is equal to that in the weld metal WM11.

On the other hand, as in one or more embodiments of the present invention shown in FIG. 5A, if the depth D11 is larger than the depth D10 and the width W11 is also larger than the width W10, the amount of the weld metal WM11 on the side of the groove G11 of the edge plate 11 is larger than the amount of the weld metal WM10 on the side of the groove G10 of the disc under repair 10A with the boundary line B therebetween. Thus, the probability of occurrence of a weld defect in the weld metal WM11 is higher than that in the weld metal WM10. For a higher probability of occurrence of a weld defect in the weld metal WM11, it is important that the depth D11 is larger than the depth D10.

As described above, in one or more embodiments of the present invention, a weld defect that may occur is guided toward the edge plate 11 to suppress a weld defect that occurs on the side of the disc under repair 10A. Then, since the edge plate 11 is removed together with the weld metal WM11 by the build-up welding, even if the weld metal WM11 includes a weld defect, the weld defect does not affect performance of the disc under repair 10A.

Figure 6A:
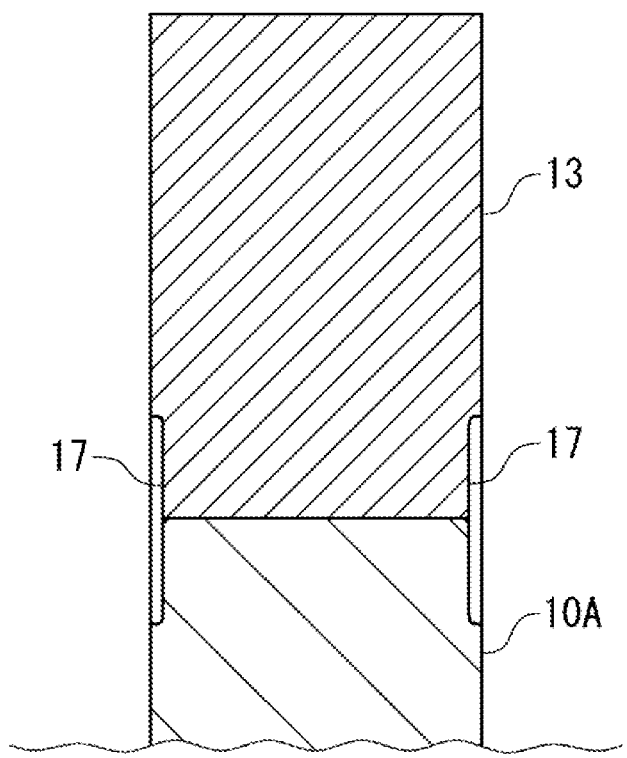
FIG. 6A shows an example of a constriction provided in a boundary portion between the disc under repair and a build-up weld.

Even if the weld defect is guided toward the edge plate 11 according to one or more embodiments of the present invention, the weld defect on the side of the disc under repair 10A sometimes cannot be completely eliminated. In this case, as shown in FIG. 6A, a predetermined region of the side surface of the disc under repair 10A including the groove G10 can be cut off by machining such as cutting or grinding to provide a constriction 17. Although machining takes effort, a weld defect that occurs has a small size and a small depth from the side surface of the disc under repair 10A in one or more embodiments of the present invention, which can minimize burden of machining. Also, providing the constriction 17 reduces mechanical strength of the rotor disc 10 after the build-up welding, but the constriction 17 is separated from the rotating shaft 14 of the rotor disc 10. Thus, a rotating operation places a light load on the constriction 17, which is unlikely to reduce a function of the rotor disc 10.

Figure 6B:
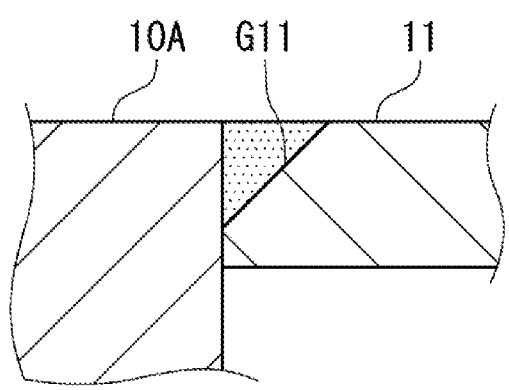
FIG. 6B shows a variant of a groove according to one or more embodiments of the present invention.

Next, in one or more embodiments of the present invention described with reference to FIG. 5A, the groove G10 is also provided in the disc under repair 10A. However, the aim of these one or more embodiments of the present invention of guiding a weld defect to the weld metal WM11 on the side of the edge plate 11 is effective for a configuration in which the groove G11 is provided only on the side of the edge plate 11 without the groove G10 being provided in the disc under repair 10A as shown in FIG. 6B. In this configuration, it can be considered that there is no weld metal WM10 on the side of the disc under repair 10A, thereby eliminating a possibility of occurrence of a weld defect. However, since providing the groove G10 also in the disc under repair 10A achieves higher joining strength by welding, the groove G10 is also provided on the side of the disc under repair 10A.

In the configuration in which no groove G10 is provided in the disc under repair 10A, both the depth D10 and the width W10 are zero.

Figure 6C:
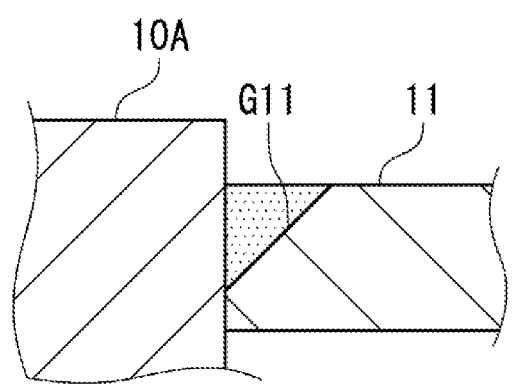
FIG. 6C shows another variant of a groove according to one or more embodiments of the present invention.

In one or more embodiments of the present invention described with reference to FIG. 5A, the outer peripheral surface of the disc under repair 10A that constitutes the surface to be welded 15 is flush with the outer peripheral surface of the edge plate 11. However, the effect of guiding a weld defect in one or more embodiments of the present invention can be also achieved even if the outer peripheral surface of the disc under repair 10A and the outer peripheral surface of the edge plate 11 are different in radial position as shown in FIG. 6C.

Also, in one or more embodiments of the present invention described with reference to FIG. 5A, the example is described in which the depth D11 is larger than the depth D10 and the width W11 is larger than the width W10. However, as described above, guiding of a weld defect may be caused by an amount of the weld metal WM10 on the side of the disc under repair 10A and an amount of the weld metal WM11 on the side of the edge plate 11. Thus, a weld defect may be also guided other than when both the depth D11 and the width W11 of the groove G11 on the side of the edge plate 11 are larger.

Figure 7:
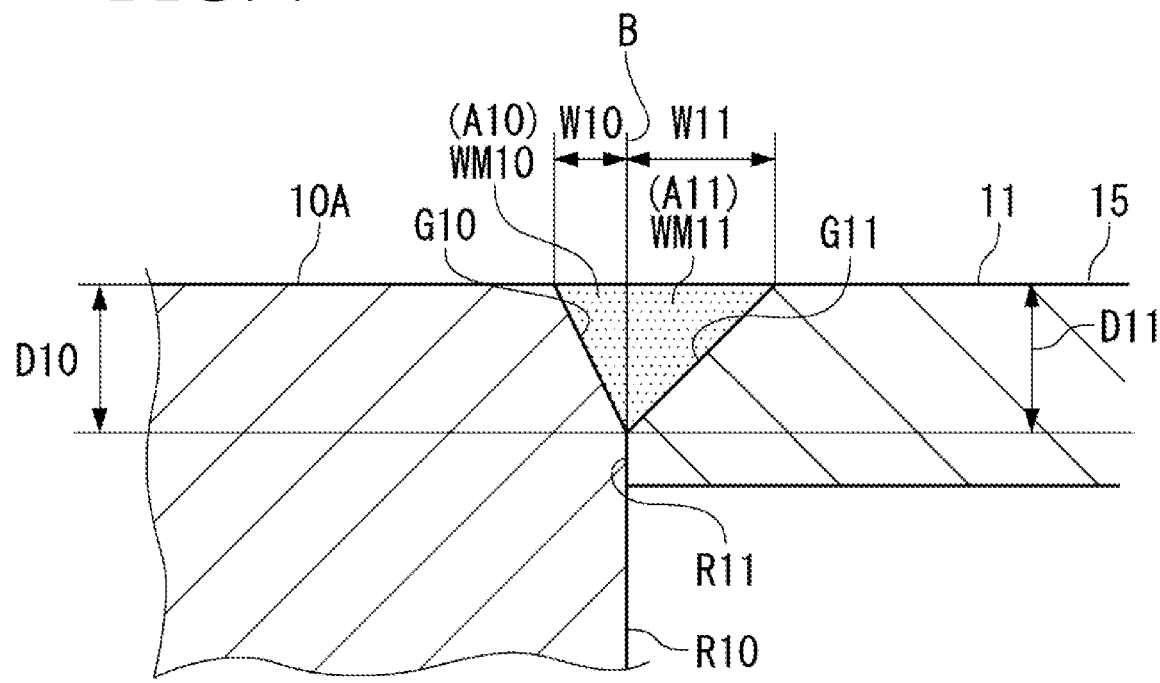
FIG. 7 shows a further variant of grooves, the grooves having the same depth while the groove of the edge plate having a larger width according to one or more embodiments of the present invention.
Figure 8:
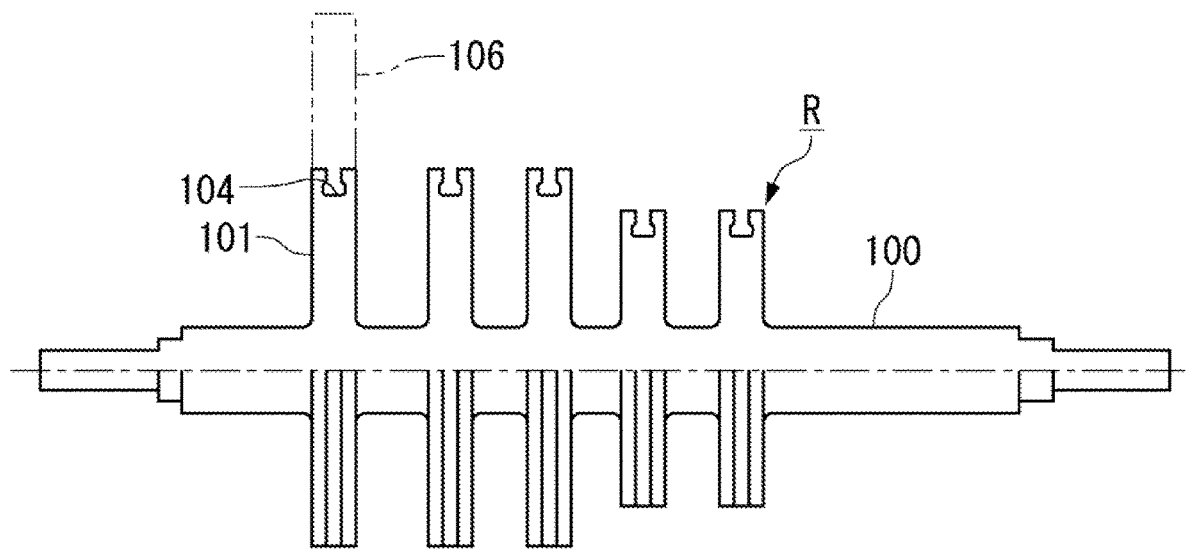
FIG. 8 is a front view, partially in section, of a general outline of a turbine rotor R used in a steam turbine, etc.

Specifically, as shown in FIG. 7, even if the depth D10 of the groove G10 is equal to the depth D11 of the groove G11, the width W11 of the groove G11 on the side of the edge plate 11 may be larger than the width W10 of the groove G10 on the side of the disc under repair 10A. Then, the amount of the weld metal WM11 on the side of the groove G11 of the edge plate 11 can be larger than the amount of the weld metal WM10 on the side of the groove G10 of the disc under repair 10A, thereby allowing a weld defect to be guided toward the weld metal WM11.

Summarizing the above examples, an area A11 occupied by the groove G11 of the edge plate 11 is larger than an area A10 occupied by the groove G10 of the disc under repair 10A in the longitudinal section through the rotating shaft 14 of the disc under repair 10A, that is, the following Expression (1) is satisfied, thereby allowing a weld defect to be guided toward the weld metal WM11 on the side of the groove G11. This can suppress a weld defect remaining on the side surface of the rotor disc 10 from which the edge plate 11 has been removed.

$$A10 < A11 \tag{1}$$

For the area A11 occupied by the groove G11 of the edge plate 11 to be larger than the area A10 occupied by the groove G10 of the rotor disc 10, there are some configurations as described below, and any of the configurations allows a weld defect to be guided to the weld metal WM11 on the side of the groove G11.

First Configuration (FIGS. 5 and 6B)

depth D10<depth D11
width W10<width W11 (including depth D10=width W10=0)
D10×W10<D11×W11

Second Configuration (FIG. 7)

depth D10=depth D11
width W10<width W11
D10×W10<D11×W11

Embodiments of the present invention have been described above. The components listed in the above one or more embodiments of the present invention may be chosen or changed to other components without departing from the scope of the present invention.

These embodiments have been described for the rotor disc 10 and the edge plate 11, however, the present invention may be applied to various applications for temporarily mounting a second member to a first member by welding with a groove, subsequently performing a predetermined treatment, and then removing the second member.

Also, for the rotor disc 10 and the edge plate 11, submerged arc welding is performed as the build-up welding after the edge plate 11 is mounted. However, the present invention does not limit a subsequent welding method, but other welding methods, for example, TIG welding may be adopted.

REFERENCE SIGNS LIST 10 rotor disc
10A disc under repair
11 edge plate
12 blade groove
13 repair portion
14 rotating shaft
15 surface to be welded
20 hopper
F flux
G10 groove G11 groove
R10 route surface
R11 route surface
WM weld metal
WM10 weld metal
WM11 weld metal Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A turbine rotor disc repairing method for removing a defect portion created in an outer peripheral portion of a turbine rotor disc having a blade groove formed in the outer peripheral portion and then reforming the blade groove, comprising:

removing a region including the defect portion from the turbine rotor disc with a rotating shaft supported horizontally to form a disc under repair;

annularly joining an edge plate along an outer peripheral edge of the disc under repair by welding;

build-up welding a surface to be welded while rotating the disc under repair around the rotating shaft; and removing an excess thickness of a build-up weld and the edge plate from the disc under repair, wherein the disc under repair includes a first groove and a first route surface continuous with the first groove, the edge plate includes a second groove and a second route surface continuous with the second groove, and when welding via the first groove and the second groove by butting the first route surface and the second route surface against each other while annularly joining the edge plate, Expression (1) is satisfied:

$$A10<A11 \qquad (1),$$

where A10 is an area of a region occupied by the first groove and A11 is an area of a region occupied by the second groove in a longitudinal section through the rotating shaft.

2. The turbine rotor disc repairing method according to claim 1, wherein at least one of Expression (2) and Expression (3) is satisfied to satisfy the Expression (1):

$$D10<D11 \qquad (2),$$

$$W10<W11 \qquad (3),$$

where D10 is a depth and W10 is a width of the region occupied by the first groove, and D11 is a depth and W11 is a width of the region occupied by the second groove.

3. The turbine rotor disc repairing method according to claim 2, wherein depth D10=width W10=0 (zero).

4. The turbine rotor disc repairing method according to claim 1, wherein Expression (4) is satisfied to satisfy the Expression (1):

$$Cx<Cy \qquad (4),$$

where Cx is a dimensional value of a C-shaped chamfer of the first groove, and Cy is a dimensional value of a C-shaped chamfer of the second groove.

5. The turbine rotor disc repairing method according to claim 1, wherein the disc under repair and the edge plate form a flush surface to be welded.

6. The turbine rotor disc repairing method according to claim 1, wherein after the build-up welding, a predetermined radial region including a boundary between the disc under repair and the build-up weld is circumferentially cut off.

7. A turbine rotor disc repairing method for removing a defect portion created in an outer peripheral portion of a turbine rotor disc having a blade groove formed in the outer peripheral portion and then reforming the blade groove, comprising:

removing a region including the defect portion from the turbine rotor disc with a rotating shaft supported horizontally to form a disc under repair;

annularly joining an edge plate along an outer peripheral edge of the disc under repair by welding;

build-up welding a surface to be welded while rotating the disc under repair around the rotating shaft; and removing an excess thickness of a build-up weld and the edge plate from the disc under repair, wherein, the disc under repair includes a first groove and a first route surface continuous with the first groove, the edge plate includes a second groove and a second route surface continuous with the second groove, and when welding via the first groove and the second groove by butting the first route surface and the second route surface against each other while annularly joining the edge plate, Expression (2) is satisfied:

$$D10<D11 \qquad (2),$$

where D10 is a depth of a region occupied by the first groove and D11 is a depth of a region occupied by the second groove.

8. The turbine rotor disc repairing method according to claim 7, wherein Expression (1) is satisfied:

$$A10<A11 \qquad (1),$$

where A10 is an area of the region occupied by the first groove and A11 is an area of the region occupied by the second groove in a longitudinal section through the rotating shaft.

* * * * *